(12) United States Patent
Christian et al.

(10) Patent No.: US 11,705,097 B2
(45) Date of Patent: *Jul. 18, 2023

(54) BATTERY POWERED DEVICES WITH ELECTRICALLY ISOLATED OUTPUTS

(71) Applicant: CB Technology, LLC, Shelton, CT (US)

(72) Inventors: David E. Christian, Sandy Hook, CT (US); Paul E. Christian, Newtown, CT (US)

(73) Assignee: CB Technology, LLC, Shelton, CT (US)

( * ) Notice: Subject to any disclaimer, the term of this patent is extended or adjusted under 35 U.S.C. 154(b) by 302 days.

This patent is subject to a terminal disclaimer.

(21) Appl. No.: 16/876,490

(22) Filed: May 18, 2020

(65) Prior Publication Data
US 2020/0279545 A1 Sep. 3, 2020

Related U.S. Application Data

(63) Continuation of application No. 16/144,291, filed on Sep. 27, 2018, now Pat. No. 10,706,828.
(Continued)

(51) Int. Cl.
*H02M 7/42* (2006.01)
*H01M 10/48* (2006.01)
(Continued)

(52) U.S. Cl.
CPC ............ *G10H 1/348* (2013.01); *G06F 1/263* (2013.01); *G10H 3/186* (2013.01);
(Continued)

(58) Field of Classification Search
CPC ......... H01M 10/0436; H01M 10/0525; H01M 10/425; H01M 10/441; H01M 10/482;
(Continued)

(56) References Cited

U.S. PATENT DOCUMENTS 5,866,829 A 2/1999 Pecoraro
5,981,862 A 11/1999 Geier
(Continued)

OTHER PUBLICATIONS http://www.boxking.net/h-pd-11.html#_jcp=2, downloaded Sep. 13, 2018.
(Continued)

*Primary Examiner* — Hal Kaplan
(74) *Attorney, Agent, or Firm* — Ryan, Mason & Lewis, LLP

(57) ABSTRACT

Battery powered devices are provided with electrically isolated outputs. One exemplary battery device comprises at least one battery; and control electronics configured to provide a plurality of outputs from one of the at least one battery, wherein the plurality of outputs comprise at least one output that is electrically isolated from at least one other output of the plurality of outputs that each provide power to one or more of a plurality of loads. In another exemplary battery device, the control electronics are configured to provide a plurality of outputs from one of the at least one battery, and further comprises a housing assembly comprising (i) at least two surfaces, wherein the at least two surfaces have a space therebetween configured to house the control electronics and the at least one battery; or (ii) a tubular structure configured to house the control electronics and the at least one battery.

21 Claims, 11 Drawing Sheets

Related U.S. Application Data

(60) Provisional application No. 62/565,614, filed on Sep. 29, 2017.

(51) Int. Cl.

| | | |
|---|---|---|
| *H01M 10/42* | (2006.01) | |
| *H01M 10/04* | (2006.01) | |
| *H01M 10/44* | (2006.01) | |
| *H02J 7/00* | (2006.01) | |
| *H02M 3/335* | (2006.01) | |
| *G10H 1/34* | (2006.01) | |
| *G06F 1/26* | (2006.01) | |
| *H01M 10/0525* | (2010.01) | |
| *G10H 3/18* | (2006.01) | |
| *H02M 1/00* | (2006.01) | |

(52) U.S. Cl.
 CPC ... *H01M 10/0436* (2013.01); *H01M 10/0525* (2013.01); *H01M 10/425* (2013.01); *H01M 10/441* (2013.01); *H01M 10/482* (2013.01); *H02J 7/00* (2013.01); *H02M 7/42* (2013.01); *G10H 2230/035* (2013.01); *H01H 2239/058* (2013.01); *H02J 7/0068* (2013.01); *H02M 1/0025* (2021.05); *H02M 3/335* (2013.01); *Y02E 60/10* (2013.01)

(58) Field of Classification Search
 CPC ........ H02J 7/00; H02J 7/0068; H02M 1/0025; H02M 3/335; H02M 7/42; H01H 2239/058; Y02E 60/70; Y02E 60/10; G06F 1/263; G10H 2230/035; G10H 1/348; G10H 3/186
 USPC .......................................................... 320/137
 See application file for complete search history.

(56) References Cited

U.S. PATENT DOCUMENTS

| | | | | |
|---|---|---|---|---|
| 6,021,499 | A * | 2/2000 | Aleshi | G06F 1/26 713/300 |
| 6,215,055 | B1 | 4/2001 | Saravis | |
| 6,459,023 | B1 | 10/2002 | Chandler | |
| 7,210,818 | B2 * | 5/2007 | Luk | H05K 1/189 362/249.14 |
| D782,567 | S | 3/2017 | Faoro | |
| D815,682 | S | 4/2018 | Trifilio et al. | |
| 9,947,302 | B2 | 4/2018 | Canivell Grifols et al. | |
| D819,120 | S | 5/2018 | Wilfer | |
| D838,575 | S | 1/2019 | Helweg | |
| 10,192,536 | B1 | 1/2019 | Jea | |
| 2005/0179393 | A1 * | 8/2005 | Murakami | H05B 45/382 315/80 |
| 2006/0044768 | A1 * | 3/2006 | Mizutani | H05K 5/006 361/752 |
| 2007/0046105 | A1 * | 3/2007 | Johnson | H02M 3/33576 307/29 |
| 2007/0295190 | A1 | 12/2007 | Collins | |
| 2008/0229914 | A1 | 9/2008 | Nathanial | |
| 2011/0271821 | A1 | 11/2011 | McKinney et al. | |
| 2011/0303077 | A1 | 12/2011 | Vinciguerra | |
| 2012/0051099 | A1 * | 3/2012 | Funaba | H03K 17/04123 363/21.17 |
| 2013/0118340 | A1 | 5/2013 | D'Amours | |
| 2013/0298752 | A1 | 11/2013 | Juszkiewicz | |
| 2014/0042986 | A1 * | 2/2014 | Chen | H01M 10/48 320/162 |
| 2014/0123838 | A1 | 5/2014 | D'Amours | |
| 2014/0290469 | A1 | 10/2014 | Michaud et al. | |
| 2015/0161978 | A1 | 6/2015 | Packouz | |
| 2016/0171959 | A1 | 6/2016 | Canivell Grifols | |
| 2016/0258574 | A1 | 9/2016 | Abbate | |
| 2016/0293151 | A1 | 10/2016 | Mayo et al. | |
| 2017/0206879 | A1 | 7/2017 | Fiden et al. | |
| 2018/0090115 | A1 | 3/2018 | Skillings et al. | |
| 2018/0151162 | A1 | 5/2018 | McKenzie | |
| 2018/0204555 | A1 | 7/2018 | Garcia et al. | |
| 2018/0301131 | A1 | 10/2018 | Jashyn | |
| 2018/0350333 | A1 | 12/2018 | Canivell Grifols | |
| 2019/0103086 | A1 | 4/2019 | Christian et al. | |

OTHER PUBLICATIONS http://www.outlawguitareffects.com/accessories/nomad, downloaded Sep. 24, 2018.
https://bigjoestompbox.com/collections/power-supplies/products/ps-205-9v-power-supply, downloaded Sep. 26, 2018.
https://www.walmart.com/c/kp/9v-dc-power-supply, downloaded Sep. 24, 2018.
http://www.voodoolab.com/pedalpower_2.htm, downloaded Sep. 24, 2018.
https://bigjoestompbox.com/products/pb-101-power-box, downloaded Sep. 26, 2018.
https://pedaltrain.com/collections/pedal-boards, downloaded Sep. 24, 2018.
http://rockboard.de/en/Home--Category.html?category=D0731396001511190771A83, downloaded Sep. 26, 2018.
http://truetone.com/1-spot/, downloaded Sep. 24, 2018.
https://bigjoestompbox.com/collections/power-supplies/products/ps-202-17ooma-power-supply, downloaded Sep. 26, 2018.

* cited by examiner

US 11,705,097 B2

BATTERY POWERED DEVICES WITH ELECTRICALLY ISOLATED OUTPUTS

CROSS-REFERENCE TO RELATED APPLICATION

The present application is a continuation of U.S. patent application Ser. No. 16/144,291, filed Sep. 27, 2018, entitled "Power Plate Pedal Board Disclosure for Musical Instrument Electronics," which claims priority to U.S. Provisional Patent Application Ser. No. 62/565,614, filed Sep. 29, 2017, entitled "Power Plate Pedal Board Disclosure for Musical Instrument Electronics," each disclosure of which is hereby incorporated by reference in their entirety.

FIELD

The field relates generally to battery powered devices.

BACKGROUND

To meet a growing demand for "clean" power, manufacturers of high-power isolated DC power supplies have begun to emerge. These DC power supplies were designed to provide multiple isolated DC power outputs but only required access to one AC outlet. Despite a number of advances and developments in AC/DC power supplies, battery power still remains the desired source of power for pedals and other devices. With battery power, pedals in the signal chain, for example, are not connected to an AC source and are not connected to each other, so every pedal in the signal chain is isolated and substantially clean. Unfortunately, when a battery is depleted, the pedal stops working (often, without notice) and, in some instances, one depleted pedal may render the signal chain substantially useless. When using batteries, musicians often mitigate the risk by replacing batteries significantly before the old battery depletes or decays.

A need remains for improved battery devices.

SUMMARY

In one embodiment, a battery device comprises at least one battery; and control electronics configured to provide a plurality of outputs from one of the at least one battery, wherein the plurality of outputs comprise at least one output that is electrically isolated from at least one other output of the plurality of outputs that each provide power to one or more of a plurality of loads.

In some embodiments, a battery device comprises at least one battery; and control electronics configured to provide a plurality of outputs from one of the at least one battery, wherein the plurality of outputs comprise at least one output that is electrically isolated from at least one other output of the plurality of outputs that each provide power to one or more of a plurality of loads; and a housing assembly comprising at least two surfaces, wherein the at least two surfaces have a space therebetween configured to house the control electronics and the at least one battery.

In another embodiment, a battery device comprises at least one battery; and control electronics configured to provide a plurality of outputs from one of the at least one battery, wherein the plurality of outputs comprise at least one output that is electrically isolated from at least one other output of the plurality of outputs that each provide power to one or more of a plurality of loads; and a housing assembly comprising a tubular structure configured to house the control electronics and the at least one battery.

Other illustrative embodiments include, without limitation, apparatus, systems, and methods.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide a power plate pedal board for musical instrument electronics.

In one or more embodiments, a battery powered pedal board is provided that comprises a plate assembly that mounts a plurality of musical effects pedals and supports a load applied to the plate assembly by one or more musicians; at least one battery; and control electronics that provide a plurality of outputs from one battery. The outputs are electrically isolated from each other and provide power to the plurality of musical effects pedals. While the pedal boards described herein are primarily illustrated for use with guitar electronics, the disclosed pedal boards can be used with electronics for any musical instrument, as would be apparent to a person of ordinary skill in the art.

One or more aspects of the present disclosure recognize that the ability to make rechargeable lithium-ion batteries in thin large surface area geometries allows for the creation of a thin composite plate structure to house the batteries and to serve as the pedal board. In some embodiments, a hollow, rigid plate structure is created utilizing spaced plate technology to support the mechanical loads applied by musicians during use of the pedal board. The hollow space inside the pedal board structure is optionally used to house the lithium-ion battery and the control electronics.

Figure 1:
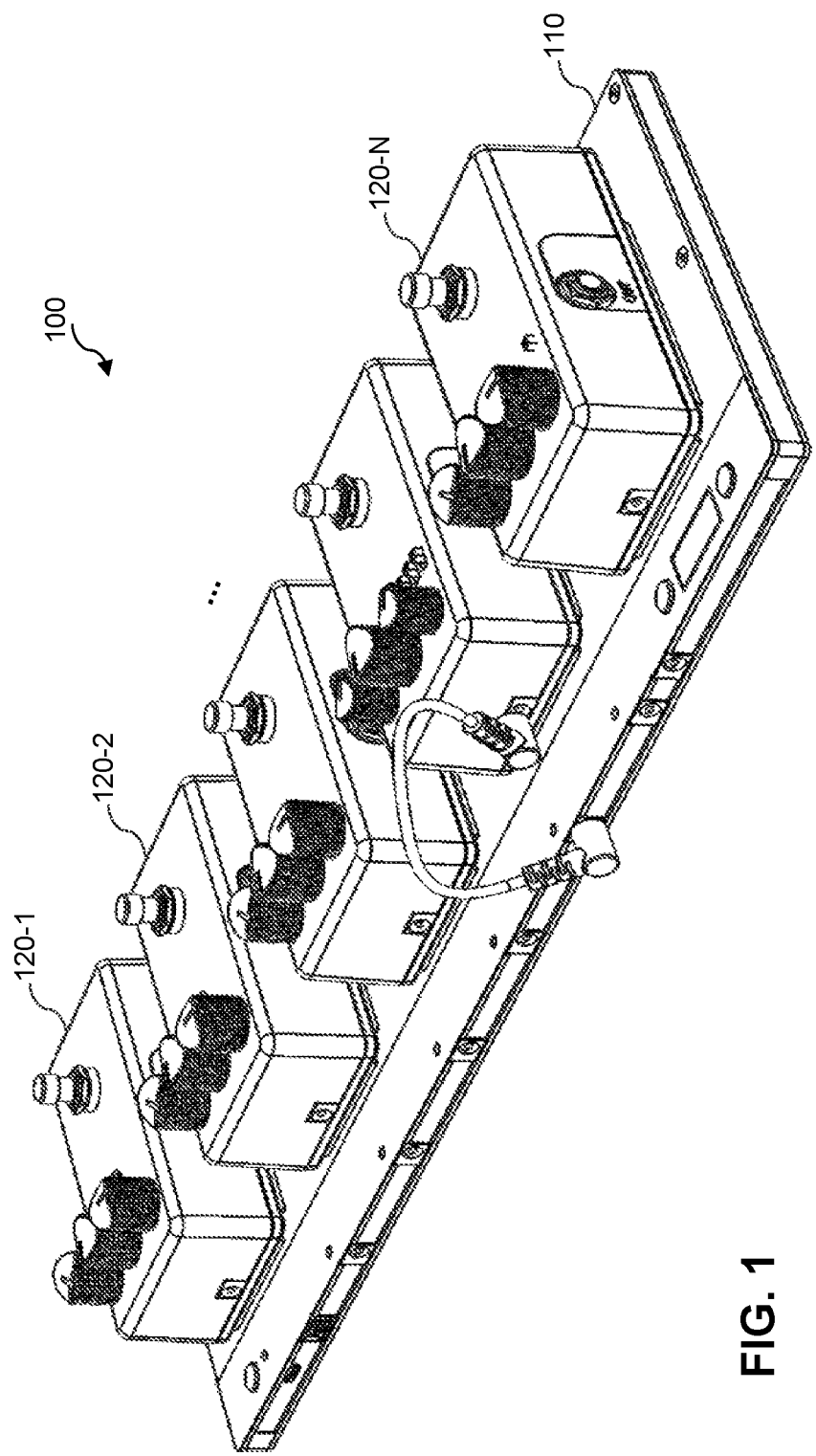
FIG. 1 illustrates an exemplary pedal board structure, according to one embodiment of the disclosure.

FIG. 1 illustrates a pedal board structure 100 according to one embodiment of the disclosure. As shown in FIG. 1, the disclosed pedal board structure 100 allows for the creation of a thin, lightweight, small footprint design that is desirable, particularly in portable and space constrained applications. This structure further benefits the user as it eliminates the need for an underside-mounted external power supply, which means that the pedal board structure 100 does not need to be raised up and can thus be made flat which is often a preferred orientation for users.

The exemplary pedal board structure 100 comprises a plate assembly 110 that mounts a plurality of musical effects pedals 120-1 through 120-N.

Alternative constructions of the exemplary pedal board structure 100 are discussed further below in conjunction with FIGS. 5 through 8.

Figure 2:
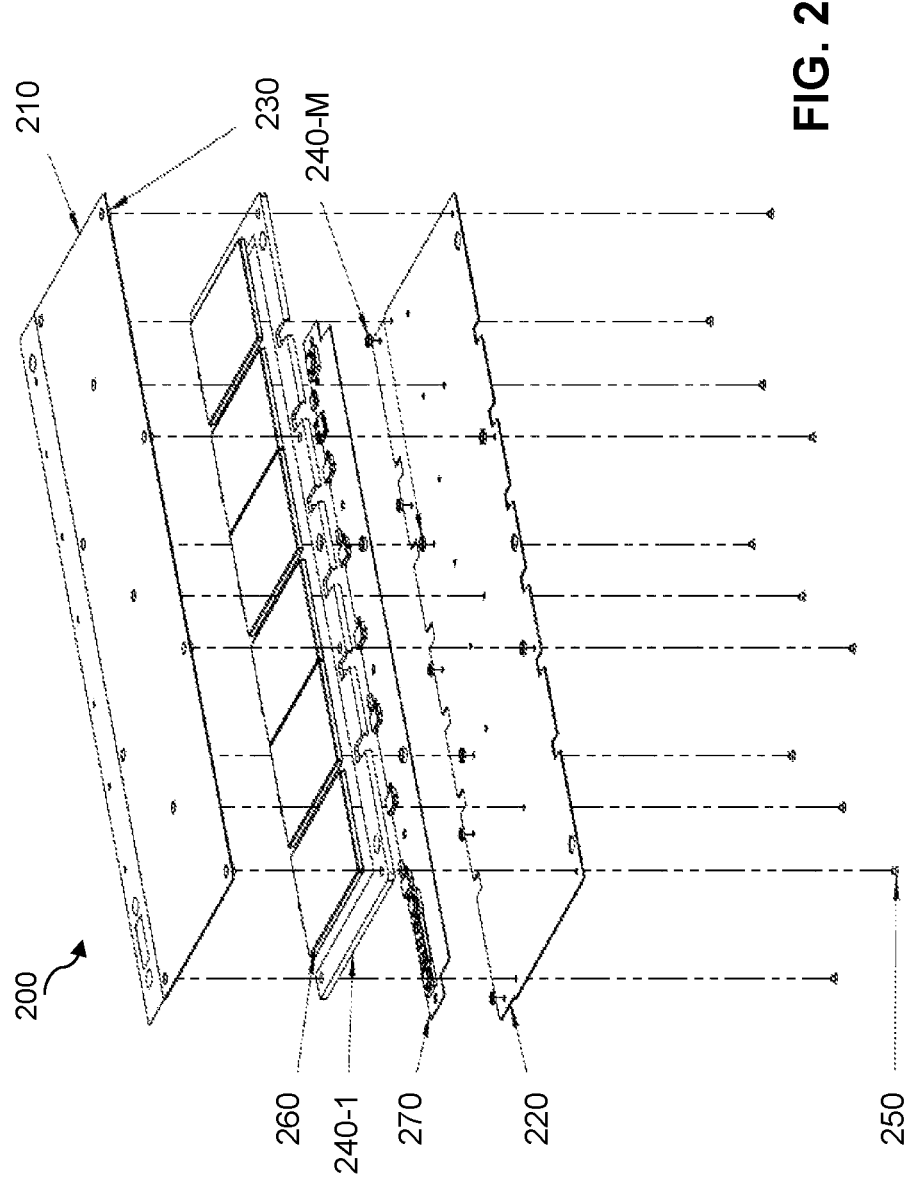
FIG. 2 illustrates an exploded view of a pedal board structure, according to an embodiment of the disclosure.

FIG. 2 illustrates an exploded view of a pedal board structure 200 according to an embodiment of the disclosure. As shown in FIG. 2, the mechanical assembly of the disclosed exemplary pedal board structure comprises a Top Plate 210, a Bottom Plate 220, a plurality of plate attachment posts 230, a plurality of spacers 240-1 through 240-M, and a plurality of screws 250. Attaching the plates in this exemplary way rigidly connects the top and bottom plates 210, 220, so that when subjected to bending loads, the upper and lower surfaces cannot bend independently of the other. The exemplary assembly method shown in FIG. 2 substantially increases the stiffness of the composite assembly of the pedal board structure 200 over that of the individual plates 210, 220. When constructed in this manner, the composite assembly stiffness of the pedal board structure 200 can approach the stiffness of a solid plate with a thickness equal to the thickness of the total plate assembly of the pedal board structure 200 (e.g., 2 inches or less). An assembly built in this way can be designed to withstand the loads applied in a pedal board environment as used by a musician.

Additional benefits of this exemplary construction shown in FIG. 2 are a lightweight design and a hollow core. As shown in FIG. 2, the hollow core allows for the placement of thin Lithium-ion batteries 260, in the space between the plates 210, 220. Thin lithium-ion batteries 260 can optionally be made in custom sizes, so creating batteries to work within the mechanical requirements of the attachment post locations can be accomplished. This space can also optionally be used to house the control printed circuit board (PCB) 270 comprising control electronics, as discussed further below in conjunction with FIGS. 3 and 4. The lightweight construction of the exemplary pedal board structure 200 of FIG. 2, in one or more embodiments, aids in the portability of the design.

While the embodiment of FIG. 2 shows the plates 210, 220 in a substantially parallel configuration, the plates 210, 220 can have a relative angle between them, as would be apparent to a person of ordinary skill in the art. In one embodiment, the plates 210, 220 are at an angle of not more than 45 degrees relative to each other.

In one or more embodiments, the disclosed control electronics in the control PCB 270 includes circuitry to support multiple isolated and/or non-isolated power outputs from a single DC power source. Additionally, in some embodiments, by providing multiple isolated power outputs from a single battery source, the array of pedals on the board can share all available battery capacity. In this way, no single pedal would cause the entire board signal chain setup to stop working. All pedals would stop working at substantially the same time, when the battery is depleted. In this manner, the worry of any single pedal losing power during usage and potentially rendering the entire pedal board signal chain useless is substantially eliminated.

Furthermore, in at least some embodiments, the disclosed battery management circuitry provides data about current draw from each output, battery charge status, and importantly, how much time is left in the battery under the current load from all pedals being powered. Knowing how much time remains in the battery is an important concern when using battery power. Additional features of the electronics optionally include, for example, switchable output voltages to accommodate the power requirements of commonly available effects pedals.

Figure 3:
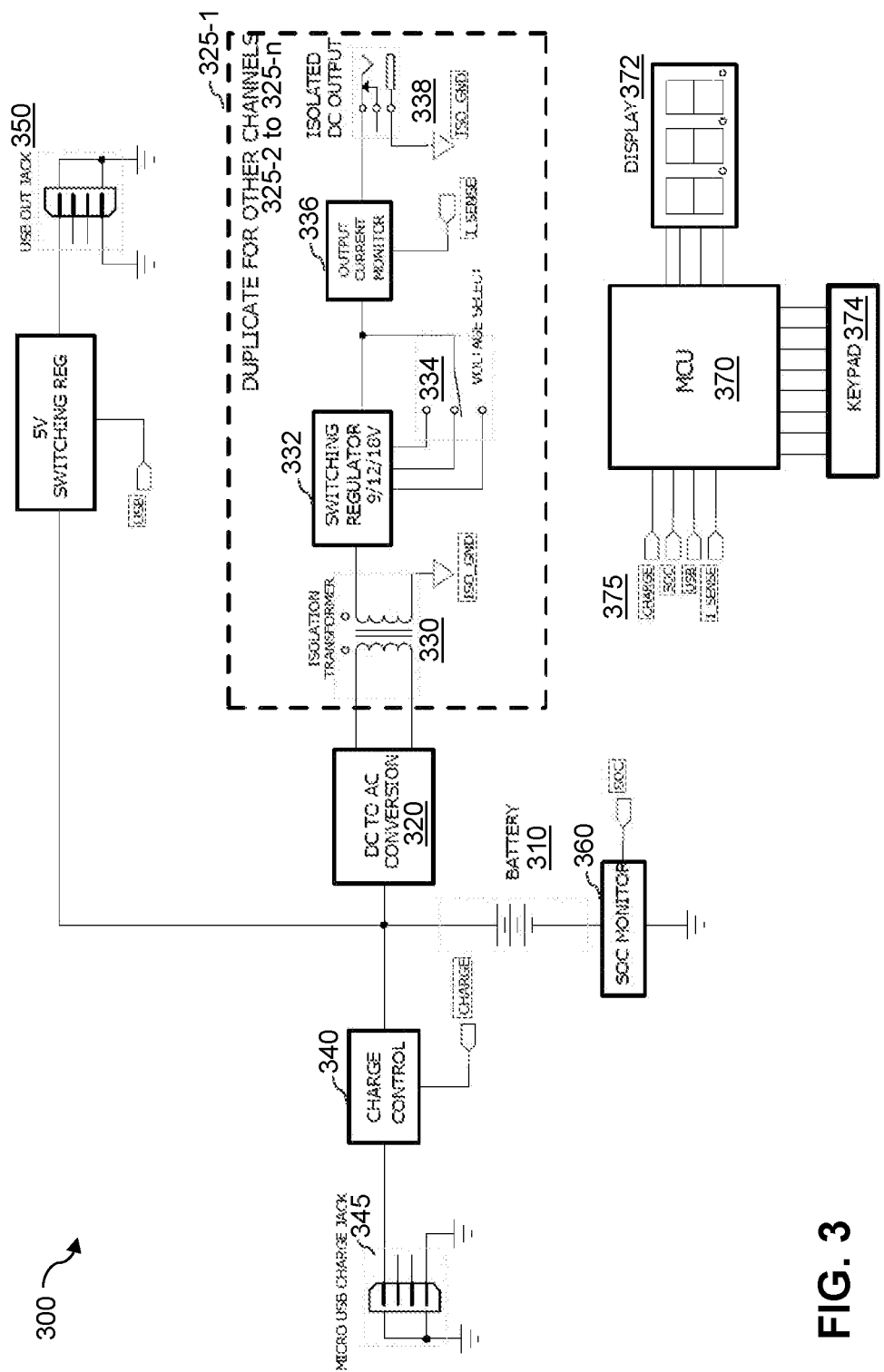
FIG. 3 is a block diagram of the control printed circuit board of FIG. 2 providing multiple isolated power outputs from a single battery source, in further detail, according to some embodiments of the disclosure.

FIG. 3 is a block diagram 300 of the control PCB 270 of FIG. 2 providing multiple isolated power outputs from a single battery source, in further detail, according to one embodiment of the disclosure. As shown in FIG. 3, in one or more embodiments, a battery 310 is applied to a DC to AC conversion circuit 320. The battery DC voltage is converted by the conversion circuit 320 into a high frequency AC waveform that is fed into a plurality of isolation transformers (only one is shown in FIG. 3 for an exemplary channel 325-1), designed to handle the frequency and amplitude of the applied AC signal. The transformer 330 magnetically transfers the input power from the primary side of the transformer 330 to the secondary side of the transformer 330. Since there is no electrical connection between the two sides of the transformer 330, the output of the transformer 330 is electrically isolated from the input of the transformer 330. An additional function of the transformer can be to optionally boost the battery voltage to the required output voltage, for example, by adjusting the transformer turns ratio. The transformer output is applied to regulator circuitry 332 to provide the required regulated output voltages. A switch 334 can optionally be incorporated to allow the user to select the output voltage for their particular application. The final block in the exemplary signal chain of the channel 325-1 is a current monitor 336. The current monitor 336 monitors the current draw of each individual isolated DC output 338-$i$. The current draw is optionally presented to the user to aid in pedal board setup and to ensure that maximum power draw limits are not exceeded.

As shown in FIG. 3, the functions and circuitry inside the dotted line associated with channel 325-1 can be duplicated one or more times to achieve additional channels 325-2 through 325-$n$, based on the number of isolated outputs required for the application. Power and output voltage for each channel 325-$i$ can be optionally adjusted, as required by the application.

One benefit of the implementation shown in FIG. 3 is that each isolated DC output 338 draws power from the same battery 310. It is noted that a single battery source can be implemented comprised of multiple cells in parallel or in series, as would be apparent to a person of ordinary skill in the art. With one battery 310 supporting multiple isolated DC outputs 338, all of the isolated DC outputs 338 share all of the available power. This, in turn, means that the accessories drawing power from any of the isolated outputs of the channels 325 will have the same time remaining for use. Knowledge of the remaining battery time allows for accurate fuel gauging and reporting of the remaining battery power. This benefit is useful in a pedal board environment, as all pedals in the signal chain will stop working at the same time and no single pedal will disrupt the signal chain due to power loss.

Other circuit functions shown in FIG. 3 include charge control circuit 340 with a micro Universal Serial Bus (USB) input charge jack 345 for charging the battery 310 and an optional courtesy USB output charge jack 350 for charging USB powered devices. A State of Charge (SOC) controller 360 keeps track of power used by the isolated outputs of each channel 325 and the power replaced by the charge control circuit 340, as discussed further below.

In one or more embodiments, the exemplary battery charge control circuit 340 is responsible for the following two exemplary functions:

1. to charge the battery 310 when an appropriate power source is connected to the charge jack 345, such as a Micro USB charge jack; and
2. to supply power to the pedal board 200 (FIG. 2).

The second function is of significant benefit to the user, as it is optionally capable of powering the pedal board load while charging the battery 310 with any excess available power. This feature provides the user with a backup power source, when the charge level of the battery 310 is too low to complete the current session. The user does not need to wait for the battery 310 to recharge before continuing use. Among other benefits, the battery charge control circuit 340 supplies power to the pedal board structure 200 while maintaining isolation of the various channels 325 (since there is no electrical connection between the two sides of the transformer 330, the output of the transformer 330 is electrically isolated from the input of the transformer 330, where the battery charge control circuit 340 is connected).

The SOC controller 360 is responsible for substantially continuously monitoring the charge level of the battery 310. With the battery charge level known, a Micro Controller Unit (MCU) 370 can calculate the power available to deliver to the load (e.g., in Watt-hour). The SOC controller 360 keeps track of how much power is removed from the battery 310 and how much power is replaced by the charge control circuit 340. This information, in conjunction with the known maximum capacity of the battery 310, allows the amount of power (e.g., in Watt-hours) remaining in the battery 310 to be calculated at any given time. As noted above, each output circuit includes a current monitor 336 that continually measures the load current of each isolated DC output 338-*i*. The output current measurement provided by the current monitor 336, in conjunction with the output voltage selected by switch 334, allows the MCU 370 to calculate the output power being drawn by each output. The MCU 370 sums the total power being drawn by all outputs and compares this value to the available power remaining of the battery 310. This comparison allows the calculation of the estimated time remaining for use at that particular power draw.

As shown in FIG. 3, the exemplary MCU 370 receives a number of feedback signals 375 from other components of the control PCB 270 of FIG. 3. In the embodiment of FIG. 3, the MCU 370 receives the following exemplary feedback signals 375: a charge feedback signal from the charge control circuit 340, an SOC feedback signal from the SOC controller 360, a USB feedback signal from the switching regulator and a current sense feedback signal from the current monitor 336 of each channel 325. The MCU 370 additionally optionally monitors all of the circuit functionality and feedback signals 375 and reports the status to the user on a digital display 372, as optionally directed by user inputs, for example, on a keypad 374.

Further refinements to the control PCB 270 of the pedal board structure 200 can be made so that commonly used musical effects (such as tuners, delay, and equalizers) are included. In this manner, the user does not need to allocate space on the top surface of the pedal board structure 200 for these functions. This reduces the size and weight of the complete pedal board or it allows for more room for other signal chain devices.

Figure 4:
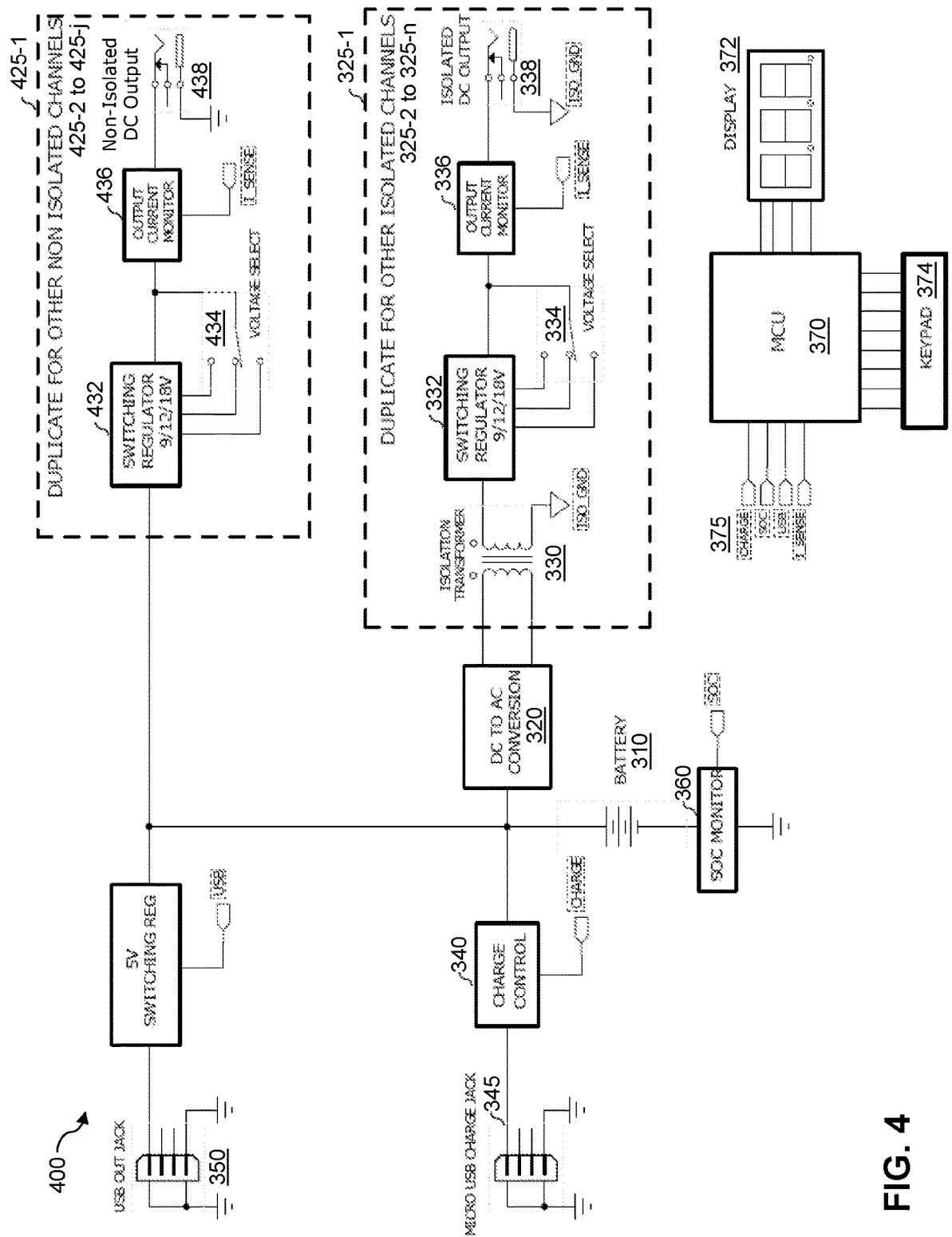
FIG. 4 is a block diagram of an alternate implementation of the control printed circuit board of FIG. 2 providing multiple isolated power outputs and non-isolated power outputs from a single battery source, in further detail, according to a further embodiment of the disclosure.

FIG. 4 is a block diagram 400 of an alternate implementation of the control PCB 270 of FIG. 2 providing multiple isolated power outputs and non-isolated power outputs from a single battery source, in further detail, according to a further embodiment of the disclosure. The like-numbered elements in FIG. 4 operate in substantially the same manner as the corresponding elements described above in conjunction with FIG. 3.

In addition, the DC output of battery 310 is directly applied to an exemplary non-isolated channel 425-1 (only one is shown in FIG. 4). As shown in FIG. 4, the exemplary non-isolated channel 425-1 comprises regulator circuitry 432 to provide the required regulated output voltages. A switch 434 can optionally be incorporated to allow the user to select the output voltage for their particular application. The final block in the exemplary signal chain of the exemplary non-isolated channel 425-1 is a current monitor 436. The current monitor 436 monitors the current draw of each individual non-isolated DC output 438-*i*. The current draw is optionally presented to the user to aid in pedal board setup and to ensure that maximum power draw limits are not exceeded.

As shown in FIG. 4, the functions and circuitry inside the dotted line associated with non-isolated channel 425-1 can be duplicated one or more times to achieve additional non-isolated channels 425-2 through 425-*j*, based on the number of non-isolated outputs required for the application. Power and output voltage for each channel non-isolated 425-*i* can be optionally adjusted, as required by the application.

Further variations of the control PCB 270 of FIG. 2 can provide multiple non-isolated DC outputs 438 from a battery 310, without any isolated DC outputs 325, as would be apparent to a person of ordinary skill in the art.

As noted above, alternate implementations of the exemplary pedal board structure 100 of FIG. 1 are discussed in conjunction with FIGS. 5 through 8.

Figure 5:
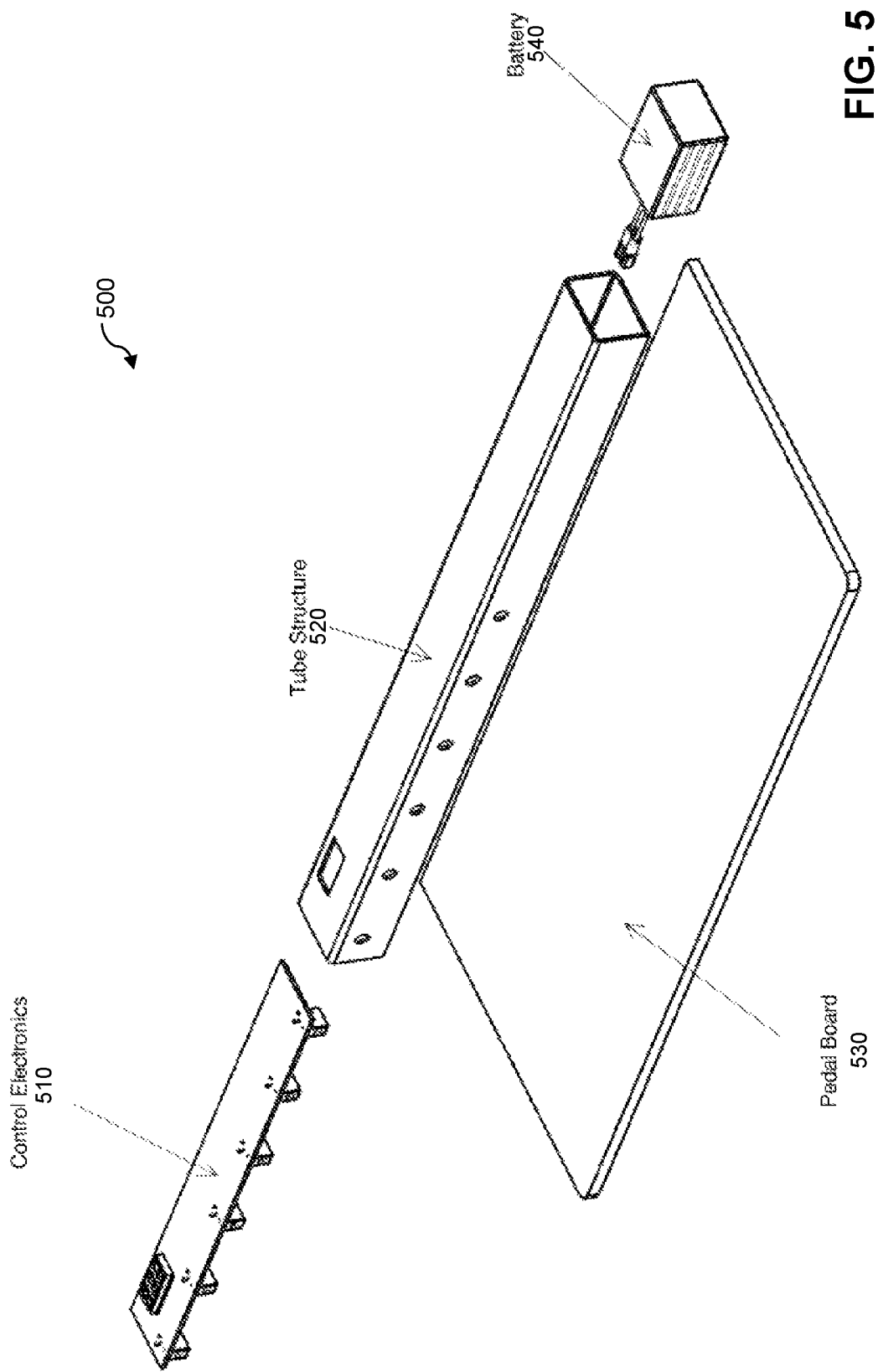
FIGS. 5 through 8 illustrate exemplary alternate implementations of the pedal board structure of FIG. 1, according to various embodiments.

FIG. 5 illustrates an alternate pedal board structure 500 according to at least one tubular embodiment of the disclosure. As shown in FIG. 5, the disclosed pedal board structure 500 allows for the creation of a thin, lightweight, small footprint design where a battery 540 and control electronics 510 slide into a tube structure 520 attached to a pedal board 530. This structure also benefits the user, in a similar manner as the embodiment of FIG. 1, as it eliminates the need for an underside-mounted external power supply, which means that the pedal board structure 500 does not need to be raised up and can thus be made flat which is often a preferred orientation for users.

The exemplary pedal board 530 of the pedal board structure 500 is configured to mount a plurality of musical effects pedals (not shown in FIG. 5), in a similar manner as the embodiment of FIG. 1.

Figure 6:
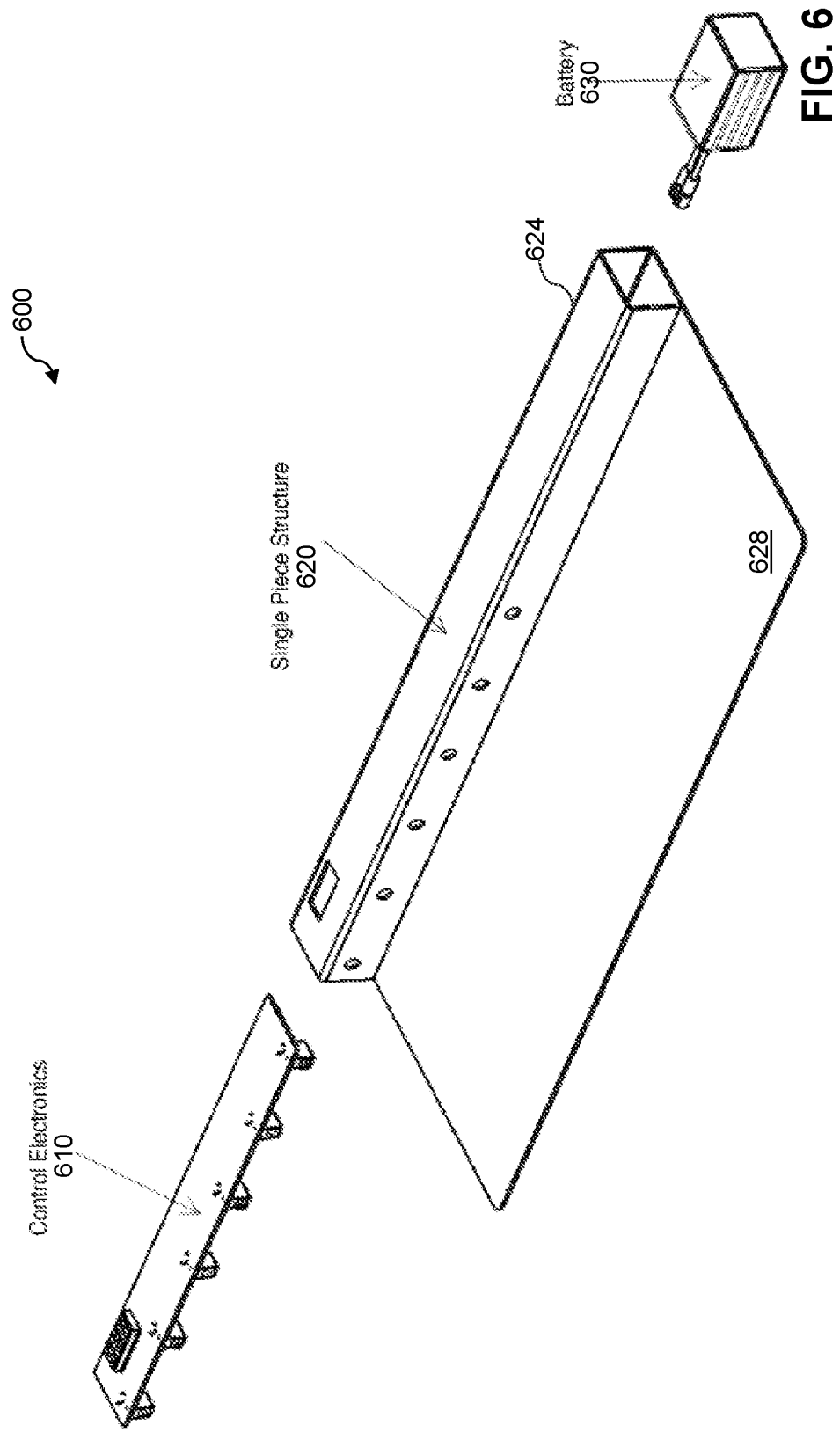

FIG. 6 illustrates a further alternate pedal board structure 600 according to a tubular embodiment of the disclosure. As shown in FIG. 6, the disclosed pedal board structure 600 allows for the creation of a thin, lightweight, small footprint design where a battery 630 and control electronics 610 slide into a single piece tube structure 620 (comprising a tube structure 624 and pedal board 628 in one integrated structure). This structure also benefits the user, in a similar manner as the embodiment of FIG. 1, as it eliminates the need for an underside-mounted external power supply, which means that the pedal board structure 600 does not need to be raised up and can thus be made flat which is often a preferred orientation for users.

The exemplary pedal board 628 of the pedal board structure 600 is configured to mount a plurality of musical effects pedals (not shown in FIG. 6), in a similar manner as the embodiment of FIG. 1.

Figure 7:
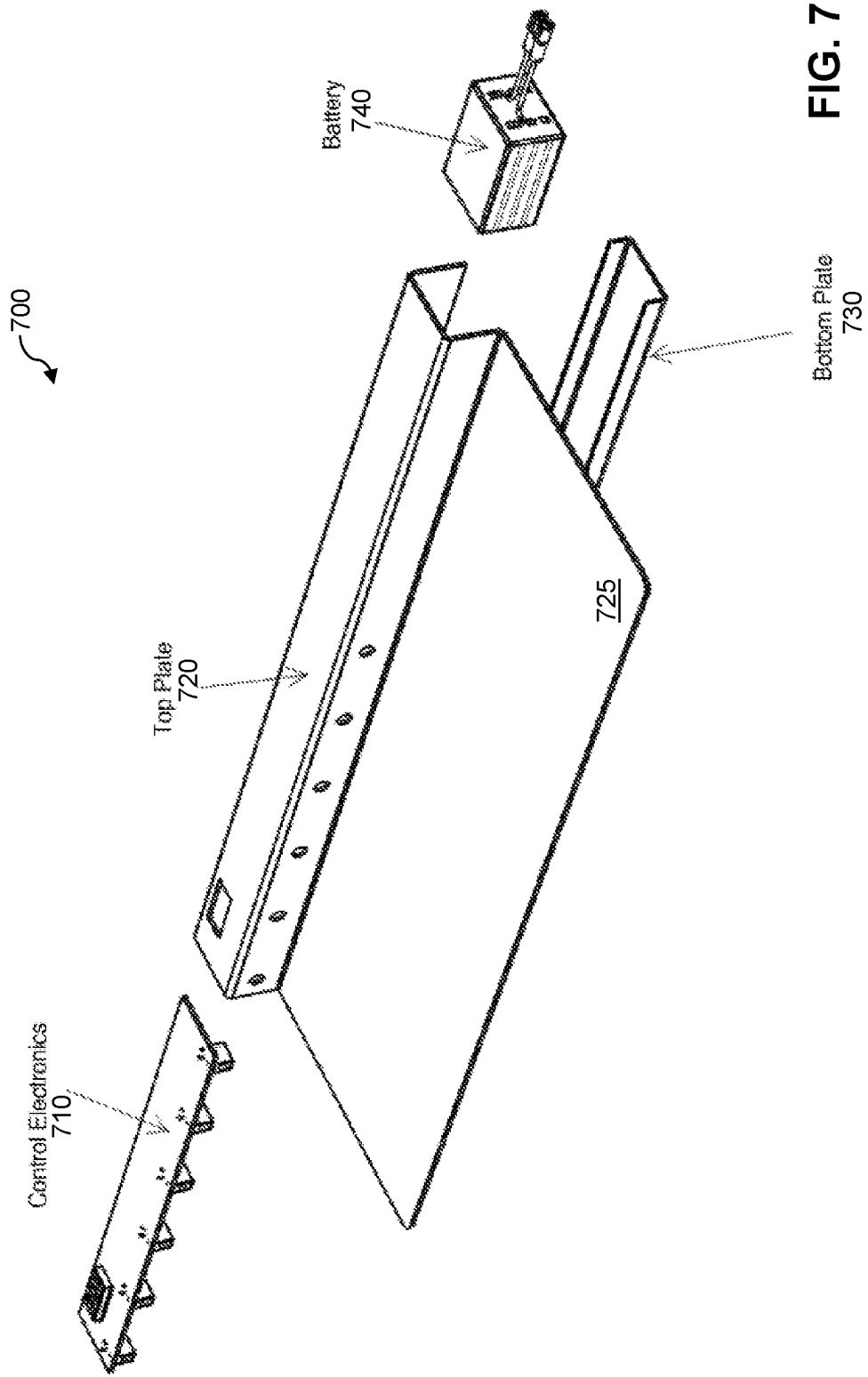

FIG. 7 illustrates yet another alternate pedal board structure 700 according to a tubular embodiment of the disclosure. As shown in FIG. 7, the disclosed pedal board structure 700 allows for the creation of a thin, lightweight, small footprint design where a battery 740 and control electronics 710 are installed from the bottom (in the example of FIG. 7) into a tube structure comprised of a top plate 720 and a bottom plate 730 (where the top plate 720 and the pedal board 725 are in one integrated structure). This structure also benefits the user, in a similar manner as the embodiment of FIG. 1, as it eliminates the need for an underside-mounted external power supply, which means that the pedal board structure 700 does not need to be raised up and can thus be made flat which is often a preferred orientation for users.

The exemplary pedal board 725 of the pedal board structure 700 is configured to mount a plurality of musical effects pedals (not shown in FIG. 7), in a similar manner as the embodiment of FIG. 1.

Figure 8:
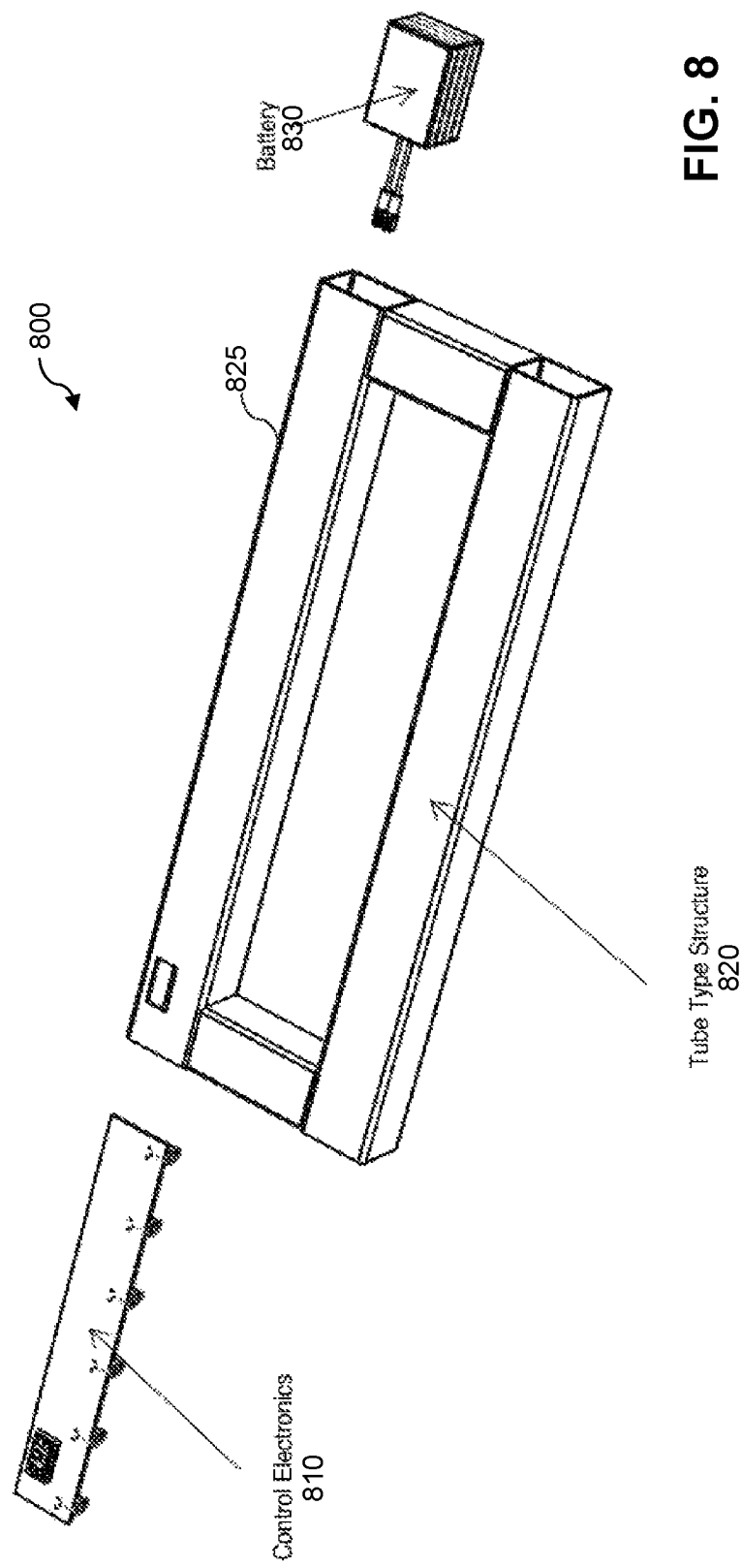

FIG. 8 illustrates a further alternate pedal board structure 800 according to a tubular embodiment of the disclosure. As shown in FIG. 8, the disclosed pedal board structure 800 allows for the creation of a thin, lightweight, small footprint design where a battery 830 and control electronics 810 slide into a tube of a single tube type structure 820 (comprising four tube structures arranged in a square to form a pedal board 825). This structure also benefits the user, in a similar manner as the embodiment of FIG. 1, as it eliminates the need for an underside-mounted external power supply, which means that the pedal board structure 800 does not need to be raised up and can thus be made flat which is often a preferred orientation for users.

The exemplary pedal board 825 of the pedal board structure 800 is configured to mount a plurality of musical effects pedals (not shown in FIG. 8), in a similar manner as the embodiment of FIG. 1.

Figure 9:
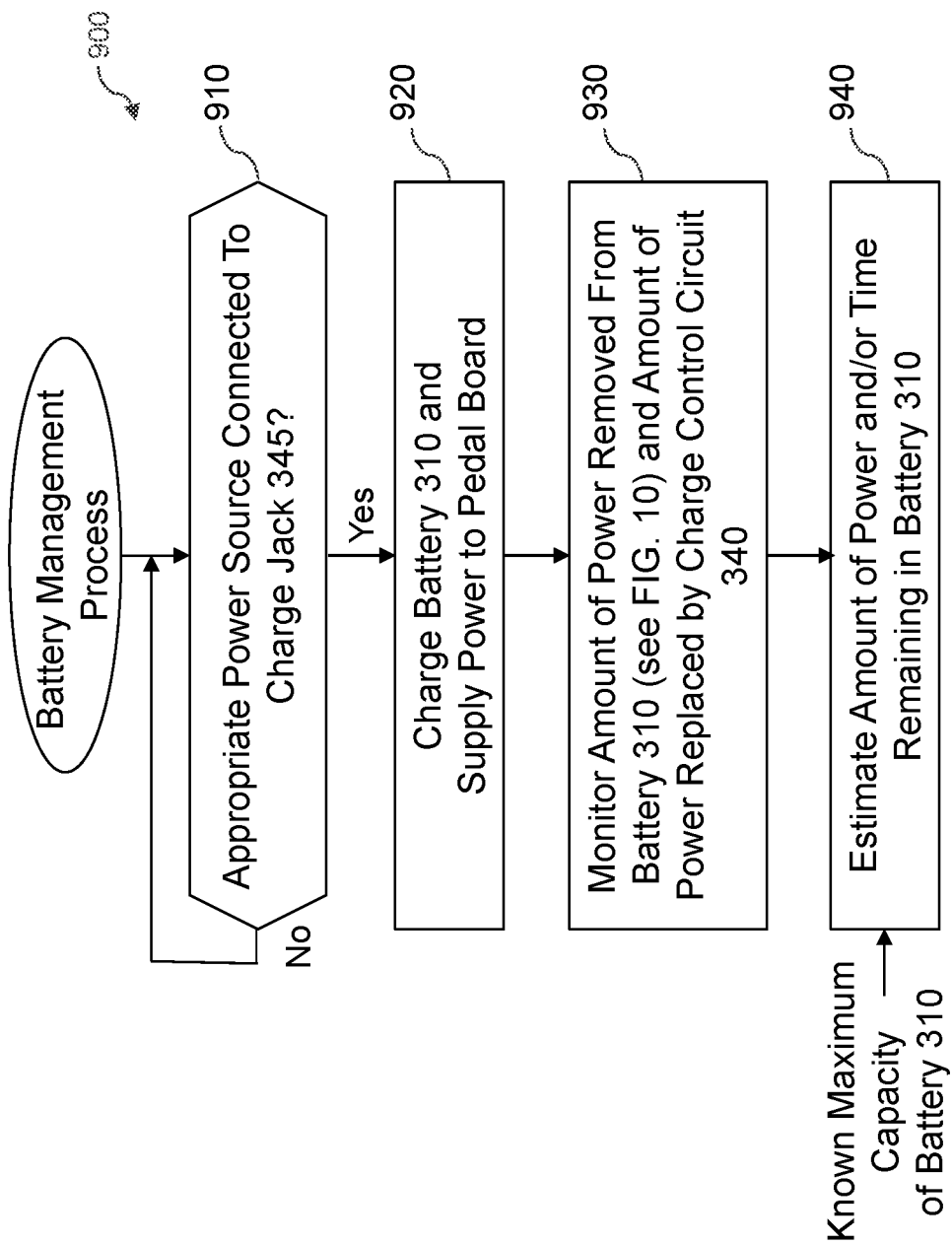
FIG. 9 is a flow chart illustrating an exemplary implementation of a battery management process, according to one embodiment of the disclosure.

FIG. 9 is a flow chart illustrating an exemplary implementation of a battery management process 900, according to one embodiment of the disclosure. As shown in FIG. 9, a test is initially performed during step 910 to determine if an appropriate power source is connected to the charge jack 345.

If it is determined during step 910 that an appropriate power source is not connected to the charge jack 345, then the exemplary battery management process 900 continues to monitor the charge jack 345 until a power source is detected.

If, however, it is determined during step 910 that an appropriate power source is connected to the charge jack 345, then the exemplary battery management process 900 charges the battery 310 and supplies power to the pedal board structure 100 during step 920.

Thereafter, the exemplary battery management process 900 monitors (i) the amount of power removed from the battery 310, as discussed further below in conjunction with FIG. 10, and (ii) the amount of power replaced by the charge control circuit 340, during step 930.

Using the information obtained during step 930 and the known maximum capacity of the battery 310, the battery management process 900 estimates the amount of power available to deliver to the load (e.g., in Watt-hours) and/or the amount of time (for the particular power draw) remaining in battery 310 during step 940.

Figure 10:
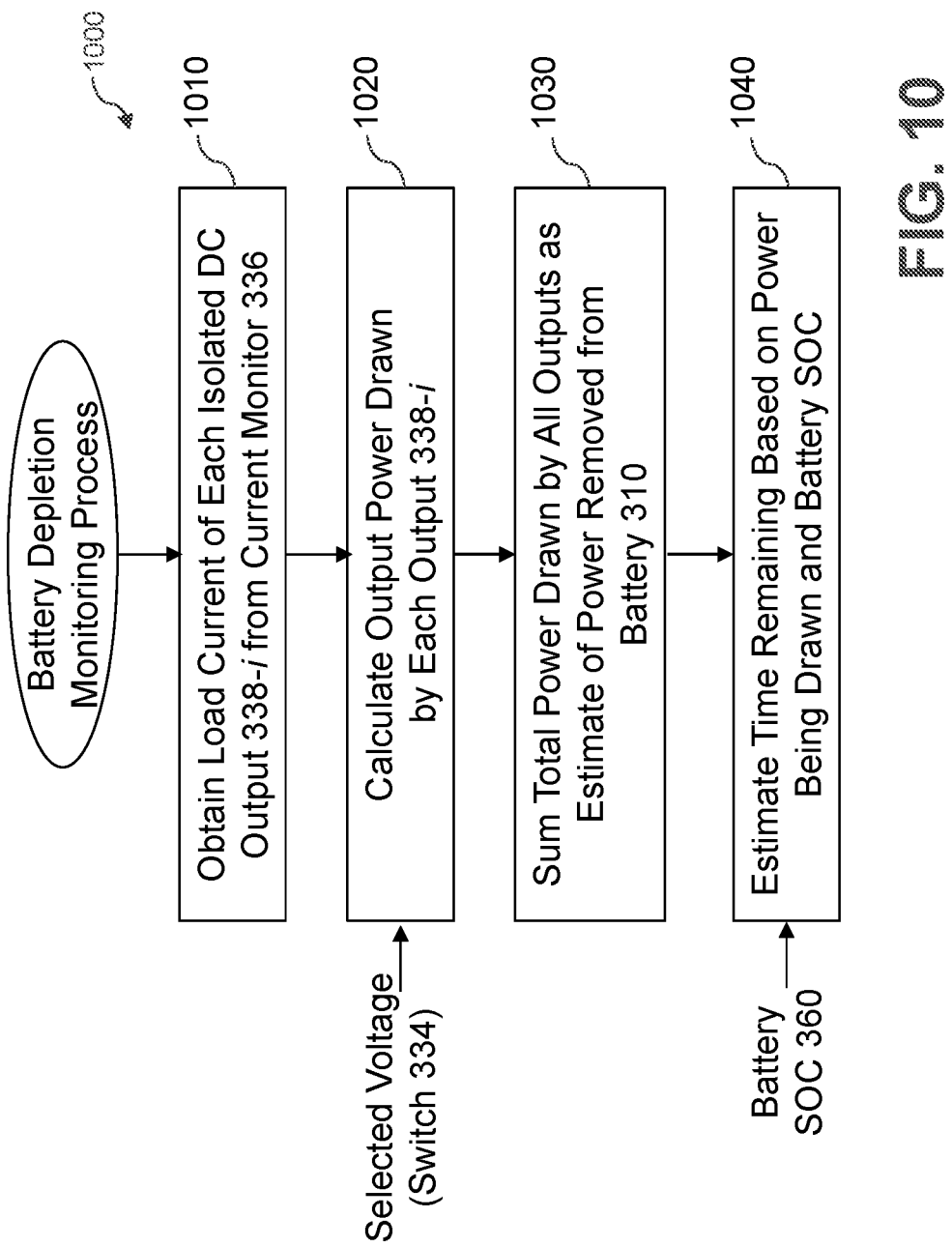
FIG. 10 is a flow chart illustrating an exemplary implementation of a battery depletion monitoring process, according to an embodiment of the disclosure.

FIG. 10 is a flow chart illustrating an exemplary implementation of a battery depletion monitoring process 1000, according to an embodiment of the disclosure. As noted above, the exemplary battery depletion monitoring process 1000 is executed during step 930 by the battery management process 900 to monitor the amount of power removed from the battery 310.

As shown in FIG. 10, the exemplary battery depletion monitoring process 1000 initially obtains the load current of each isolated DC output 338-$i$ from the current monitor 336 during step 1010. As noted above, each output circuit includes a current monitor 336 that continually measures the load current of each isolated DC output 338-$i$.

Thereafter, using the load current of each isolated DC output 338-$i$ and the selected voltage (e.g., via switch 334), the exemplary battery depletion monitoring process 1000 calculates the output power drawn by each isolated DC output 338-$i$ during step 1020.

The exemplary battery depletion monitoring process 1000 then sums the total power drawn by all of the isolated DC outputs 338 during step 1030, as an estimate of the power removed from the battery 310.

Finally, the time remaining on the battery charge is estimated during step 1040 based on the power being drawn (from the previous step) and the battery SOC controller 360.

Example

Guitar players and other musicians, for example, have long used effects pedals, also known as stomp boxes, in their signal chain to enhance and compliment amplified music tones. Over time, digital technologies opened the door for pedals powered by Integrated Circuit (IC) that could recreate many useful sounds for musicians. Many of these effects required more power and were typically designed to be powered by Alternating Current/Direct Current (AC/DC) adapters, requiring access to electrical outlets and/or power strips. Higher power AC/DC power adapters, often coupled with multi-plug daisy chain cables, emerged as a way to power many pedals using a single AC input. With common ground returns and power feeds, however, this setup proved to be susceptible to noise and cross-talk interference between the pedals in the chain.

To meet a growing demand for "clean" power, manufacturers of high-power isolated DC power supplies began to emerge. These DC power supplies were designed to provide multiple isolated DC power outputs but only required access to one AC outlet. Despite a number of advances and developments in AC/DC power supplies, battery power still remains the desired source of power for pedals. With battery power, pedals in the signal chain are not connected to an AC source and are not connected to each other, so every pedal in the signal chain is isolated and substantially clean. Unfortunately, when a battery is depleted, the pedal stops working (often, without notice) and, in some instances, one depleted pedal may render the signal chain substantially useless. When using batteries, musicians often mitigate the risk by replacing batteries significantly before the old battery depletes or decays.

In one use case, the electrically isolated outputs of the disclosed battery powered devices may be used to power such effects pedals.

CONCLUSION

Aspects of the present invention are described herein with reference to illustrations and/or block diagrams of structures and apparatus (systems) according to embodiments of the invention. It is to be appreciated that each block of the block diagrams, for example, and combinations of blocks in the block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 11:
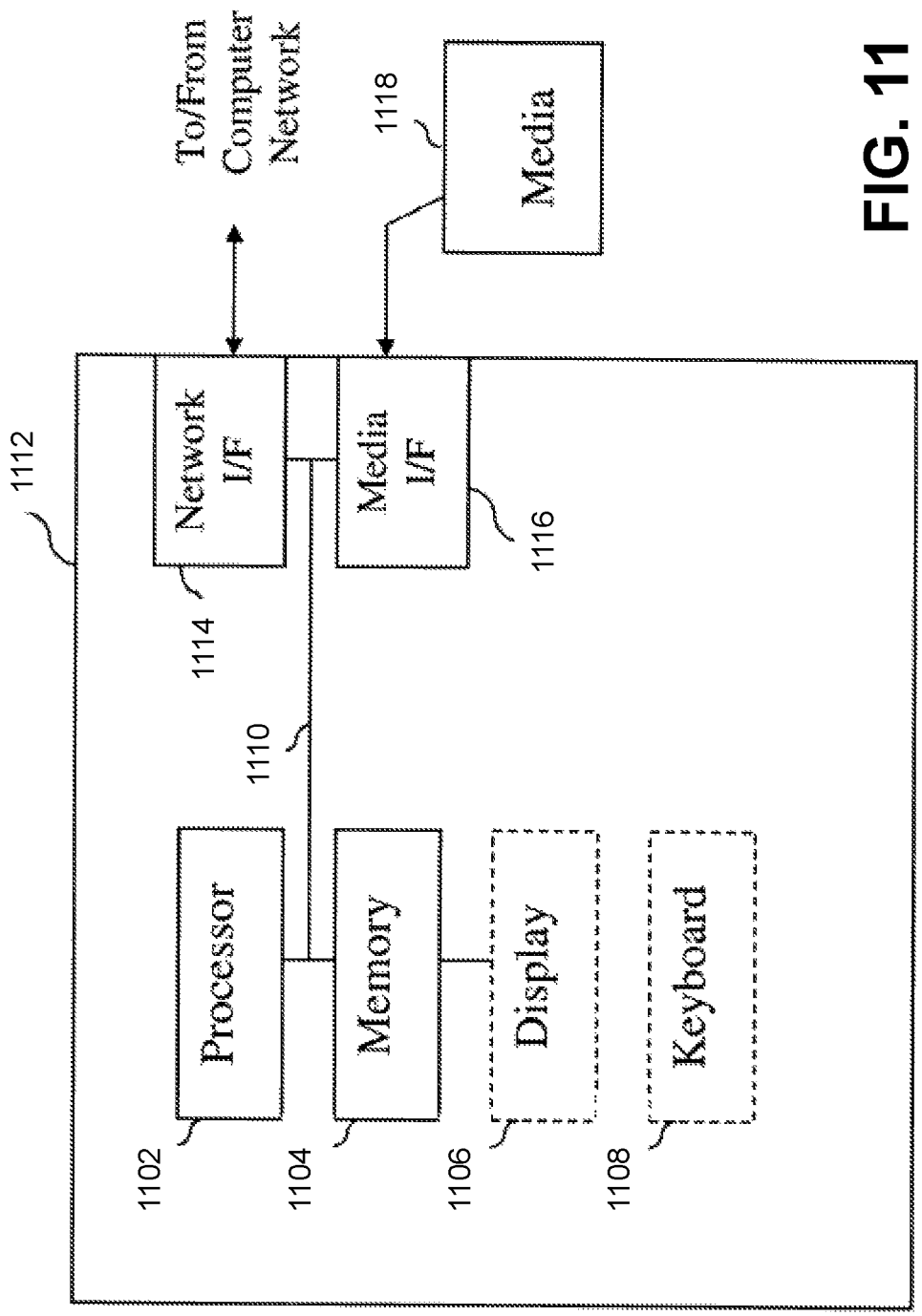
FIG. 11 is a system diagram of an exemplary computer system on which at least one embodiment of the invention can be implemented.

By way of example, an aspect of the present invention can make use of software running on a general-purpose computer. FIG. 11 is a system diagram of an exemplary computer system on which at least one embodiment of the invention can be implemented. As depicted in FIG. 11, an example implementation employs, for example, a processor 1102, a memory 1104, and an input/output interface formed, for example, by a display 1106 and a keyboard 1108. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 1102, memory 1104, and input/output interface such as display 1106 and keyboard 1108 can be interconnected, for example, via bus 1110 as part of a data processing unit 1112. Suitable interconnections via bus 1110, can also be provided to a network interface 1114 (such as a network card), which can be provided to interface with a computer network, and to a media interface 1116 (such as a diskette or compact disc read-only memory (CD-ROM) drive), which can be provided to interface with media 1118.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1108, displays 1106, and pointing devices, can be coupled to the system either directly (such as via bus 1110) or through intervening I/O controllers.

Network adapters such as network interface 1114 (for example, a modem, a cable modem or an Ethernet card) can also be coupled to the system to enable the data processing system to become coupled to other data processing systems or remote printers or storage devices through intervening private or public networks.

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of musical pedals that can benefit from improved pedal boards described herein. Accordingly, the particular illustrative configurations of system and structural elements detailed herein can be varied in other embodiments. These and numerous other alternative embodiments within the scope of the appended claims will be readily apparent to those skilled in the art.

What is claimed is:

1. A battery device, comprising:
at least one battery having an input ground; and
control electronics configured to provide a plurality of outputs from one of the at least one battery, wherein the plurality of outputs comprise at least one output that is electrically isolated from at least one other output of the plurality of outputs that each provide power to one or more of a plurality of loads, wherein the electrical isolation is based at least in part on the at least one output having a first output ground that is isolated from a second output ground of the at least one other output, and wherein the input ground, the first output ground, and the second output ground are electrically isolated from each other.

2. The battery device of claim 1, further comprising a housing assembly having a thickness of less than 2.0 inches.

3. The battery device of claim 1, wherein the plurality of outputs is supplied power from the at least one battery, wherein the at least one battery comprises one or more cells.

4. The battery device of claim 1, wherein the control electronics are configured to dynamically estimate one or more of an amount of power remaining and an amount of time remaining in the at least one battery.

5. The battery device of claim 4, wherein the control electronics are further configured to monitor an amount of power removed from the at least one battery and an amount of power replaced in the at least one battery using a charge control circuit to determine an amount of power remaining in the at least one battery at a given time.

6. The battery device of claim 4, wherein the control electronics are further configured to monitor a load current of each of the plurality of outputs using a current monitor.

7. The battery device of claim 4, wherein the control electronics are further configured to determine a total amount of power drawn by the plurality of loads and to compare the total amount of drawn power to the power remaining in the at least one battery at a given time to determine the amount of time remaining.

8. The battery device of claim 1, wherein the control electronics further comprise circuitry to share available battery capacity from the at least one battery among the plurality of loads.

9. The battery device of claim 1, wherein the control electronics further comprise a DC-to-AC converter to generate an AC signal from the at least one battery and at least one isolation transformer comprising two sides to provide electrical isolation between the two sides of the at least one isolation transformer.

10. The battery device of claim 9, wherein the at least one isolation transformer boosts a voltage of the AC signal.

11. The battery device of claim 9, wherein there is no electrical connection between the two sides of the at least one isolation transformer.

12. The battery device of claim 9, wherein the two sides of the at least one isolation transformer comprise an input side and an output side, and wherein one or more grounds associated with the input side of the at least one isolation transformer are electrically isolated from one or more grounds associated with the plurality of outputs on the output side of the at least one isolation transformer.

13. The battery device of claim 1, wherein the control electronics further comprise charge circuitry to recharge the at least one battery, and wherein the battery device maintains the electrical isolation of the plurality of outputs when the battery device is operated during a battery recharge operation.

14. The battery device of claim 1, further comprising a tubular structure configured to house the control electronics and the at least one battery.

15. The battery device of claim 1, further comprising a tubular structure configured to (i) house the control electronics and the at least one battery, and (ii) to mount the plurality of loads.

16. A battery device, comprising:
at least one battery having an input ground; and
control electronics configured to provide a plurality of outputs from one of the at least one battery, wherein the plurality of outputs comprise at least one output that is electrically isolated from at least one other output of the plurality of outputs that each provide power to one or more of a plurality of loads, wherein the electrical isolation is based at least in part on the at least one output having a first output ground that is isolated from a second output ground of the at least one other output, and wherein the input ground, the first output ground, and the second output ground are electrically isolated from each other; and
a housing assembly comprising at least two surfaces, wherein the at least two surfaces have a space therebetween configured to house the control electronics and the at least one battery.

17. The battery device of claim 16, wherein the at least two surfaces are at an angle of not more than 45 degrees relative to each other.

18. The battery device of claim 16, wherein the housing assembly has a thickness of less than 2.0 inches.

19. The battery device of claim 16, wherein the control electronics further comprise a DC-to-AC converter to generate an AC signal from the at least one battery and at least one isolation transformer comprising two sides to provide electrical isolation between the two sides of the at least one isolation transformer and wherein there is no electrical connection between the two sides of the at least one isolation transformer.

20. A battery device, comprising:
at least one battery having an input ground; and
control electronics configured to provide a plurality of outputs from one of the at least one battery, wherein the plurality of outputs comprise at least one output that is electrically isolated from at least one other output of the plurality of outputs that each provide power to one or more of a plurality of loads, wherein the electrical isolation is based at least in part on the at least one output having a first output ground that is isolated from a second output ground of the at least one other output, and wherein the input ground, the first output ground, and the second output ground are electrically isolated from each other; and
a housing assembly comprising a tubular structure configured to house the control electronics and the at least one battery.

21. The battery device of claim 20, wherein the tubular structure comprises one or more of a single-piece tube and a tube formed from a top surface and a bottom surface.

* * * * *